US010590030B2

(12) United States Patent
Inamoto et al.

(10) Patent No.: US 10,590,030 B2
(45) Date of Patent: Mar. 17, 2020

(54) GLASS PLATE, TOUCH PAD, AND TOUCH PANEL

(71) Applicant: AGC Inc., Chiyoda-ku (JP)

(72) Inventors: Misa Inamoto, Chiyoda-ku (JP); Naoki Okahata, Chiyoda-ku (JP); Takashi Shibuya, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 89 days.

(21) Appl. No.: 15/989,252

(22) Filed: May 25, 2018

(65) Prior Publication Data

US 2018/0273421 A1 Sep. 27, 2018

Related U.S. Application Data

(63) Continuation of application No. PCT/JP2016/085233, filed on Nov. 28, 2016.

(30) Foreign Application Priority Data

Nov. 30, 2015 (JP) ................................. 2015-234217

(51) Int. Cl.
*C03C 15/00* (2006.01)
*C03C 17/42* (2006.01)
(Continued)

(52) U.S. Cl.
CPC .............. *C03C 15/00* (2013.01); *C03C 17/30* (2013.01); *C03C 17/42* (2013.01); *C03C 21/001* (2013.01);
(Continued)

(58) Field of Classification Search
CPC ....... C03C 15/00; C03C 21/001; C03C 17/30; C03C 17/42; C03C 2204/08; G06F 3/03547; G06F 3/041; G06F 2203/04103
See application file for complete search history.

(56) References Cited

U.S. PATENT DOCUMENTS

2009/0197048 A1 8/2009 Amin et al.
2016/0141432 A1* 5/2016 Sasaki ................... C03C 17/25
                                                                                              136/246
(Continued)

FOREIGN PATENT DOCUMENTS

JP          2010-070445         4/2010
JP          2011-510904         4/2011
(Continued)

OTHER PUBLICATIONS

International Search Report dated Feb. 14, 2017 in PCT/JP2016/085233 filed Nov. 28, 2016 (with English Translation).
(Continued)

*Primary Examiner* — Andrew Sasinowski
(74) *Attorney, Agent, or Firm* — Oblon, McClelland, Maier & Neustadt, L.L.P.

(57) ABSTRACT

A glass plate includes a main surface, and a microscopic asperity surface disposed on the main surface, the microscopic asperity surface forming peaks and valleys. When a reference plane is defined as a plane at a center, in a direction of height, of an interval of highest frequency in a histogram of height of shape data of a square region having 2 μm per side in the microscopic asperity surface, the number of peaks that are higher than the reference plane by 20% or more of a maximum height difference in the square region is in a range between 1 or more and 300 or less.

18 Claims, 4 Drawing Sheets

(51) Int. Cl.
  *G06F 3/041*   (2006.01)
  *G06F 3/0354*  (2013.01)
  *C03C 17/30*   (2006.01)
  *C03C 21/00*   (2006.01)

(52) U.S. Cl.
  CPC .......... *G06F 3/03547* (2013.01); *G06F 3/041* (2013.01); *C03C 2204/08* (2013.01); *G06F 2203/04103* (2013.01)

(56) References Cited

U.S. PATENT DOCUMENTS

| | | | |
|---|---|---|---|
| 2016/0200625 A1* | 7/2016 | Miyasaka | C03C 3/087 |
| | | | 428/141 |
| 2016/0313494 A1* | 10/2016 | Hamilton | G02B 5/0221 |
| 2016/0318794 A1 | 11/2016 | Tanaka et al. | |
| 2017/0235418 A1 | 8/2017 | Inamoto et al. | |

FOREIGN PATENT DOCUMENTS

| | | | |
|---|---|---|---|
| WO | WO 2012/160894 A1 | 11/2012 | |
| WO | WO 2015/093029 A1 | 6/2015 | |
| WO | WO 2016/080432 A1 | 5/2016 | |

OTHER PUBLICATIONS

Written Opinion dated Feb. 14, 2017 in PCT/JP2016/085233 filed Nov. 28, 2016.

K J Stout, et al., "The Development of Methods For the Characterisation of Roughness in Three Dimensions," Pub No. Eur 15178 EN of the Commission of the European Communities, 1994, 380 Pages.

\* cited by examiner

GLASS PLATE, TOUCH PAD, AND TOUCH PANEL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/085233 filed on Nov. 28, 2016 and designating the U.S., which claims priority of Japanese Patent Application No. 2015-234217 filed on Nov. 30, 2015. The entire contents of the foregoing application are incorporated herein by reference.

BACKGROUND OF THE INVENTION

Field of the Invention

The disclosures discussed herein relate to a glass plate, a touch pad, and a touch panel.

Base materials provided with various functional layers designed for touch pads and touch panels have been developed (see, for example, Patent Document 1). According to Patent Document 1, as a functional layer, a hard coat layer is formed of a cured product of a polymerizable composition containing fine particles having an average particle size of 1 to 100 μm. The resulting articles will be provided with such a hard coat layer having high hardness without scratchiness with fingers.

CITATION LIST

Patent Literature

[PTL 1] International Publication Pamphlet No. WO 2012/160894

SUMMARY OF THE INVENTION

Technical Problem

However, in the article obtained in Patent Document 1, the particle size of the polymerizable composition used in the functional layer is as large as an order of microns, which may scatter light resulting in haze.

The main object of the present invention is to provide a glass plate having a satisfactory finger sliding property and low haze without having a functional layer.

Solution to Problem

According to an aspect of the present invention, a glass plate includes:

a main surface; and a microscopic asperity surface disposed on the main surface, the microscopic asperity surface forming peaks and valleys, wherein when a reference plane is defined as a plane at a center, in a direction of height, of an interval of highest frequency in a histogram of height of shape data of a square region having 2 μm per side in the microscopic asperity surface, a number of peaks that are higher than the reference plane by 20% or more of a maximum height difference in the square region is in a range between 1 or more and 300 or less.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

The following illustrates an embodiment of the present disclosure with reference to the accompanying drawings. In each drawing, the same reference number or symbol is assigned to the same component, and redundant explanation will be omitted. In the present specification, notation such as "A-B" or "A to B" may be used for expressing a range of a value. When a range of a value is described as "A-B" or "A to B", it means that A and B are included in the range. That is, "A-B" or "A to B" means that values not less than A and not more than B are included in the range.

Glass Plate

Figure 1:
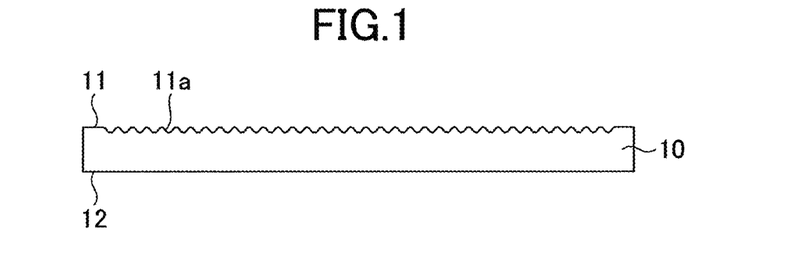
FIG. 1 is a diagram illustrating a glass plate according to one embodiment.

FIG. 1 is a diagram illustrating a glass plate according to one embodiment. In FIG. 1, the asperity of a microscopic asperity surface 11a is magnified. The glass plate 10 has a first main surface 11 that is provided with a microscopic asperity surface 11a. The surface roughness Ra of the microscopic asperity surface 11a is in a range of 0.3 to 100 nm. Ra is preferably in a range of 1 to 50 nm, and is more preferably in a range of 2 to 30 nm. Note that the surface roughness Ra is the arithmetic mean roughness described in Japanese Industrial Standard JIS B 0601.

The microscopic asperity surface 11a may be formed over the entire first main surface 11 or may be formed only on a part of the first main surface 11. A second main surface 12 that is opposite to the first main surface 11 provided with the microscopic asperity surface 11a may be, for example, a flat surface.

According to one aspect of the present invention, in a histogram of height of shape data of a square region having 2 μm per side in a microscopic asperity surface having peaks (protrusions) and valleys (depressions), when a reference plane is defined as a plane at a center, in a direction of height, of an interval of highest frequency in the histogram, a number of peaks (protrusions) that are higher than the reference plane by 20% or more of a maximum height difference in the square region (hereinafter simply referred to as "the number of peaks") is in a range between 1 or more and 300 or less.

Note that the position of the square region may be any position of the microscopic asperity surface 11a. A histogram analysis may be performed with respect to height in an AFM image of a predetermined square region. Height is measured from the lowest position of the square region in a direction orthogonal to a plane calculated by least squares. The maximum height difference indicates a height from the lowest position of the square region to the highest position of the square region. The frequency of height is calculated for each of 500 equally divided intervals between the lowest position of the square region and the highest position of the square region. The reference plane is defined as a plane at a center, in a direction of height, of the interval of highest frequency in the histogram.

The number of peaks (protrusions) in the square region falling within a range between 1 or more and 300 or less indicates that there is an adequate number of peaks having sufficiently detectable heights with a human finger; this indicates that a contact area between a finger and the glass plate will fall within an adequate range, thereby providing an excellent finger sliding property. The number of peaks is preferably 280 or less, more preferably 250 or less, and further preferably 240 or less.

Figure 2:
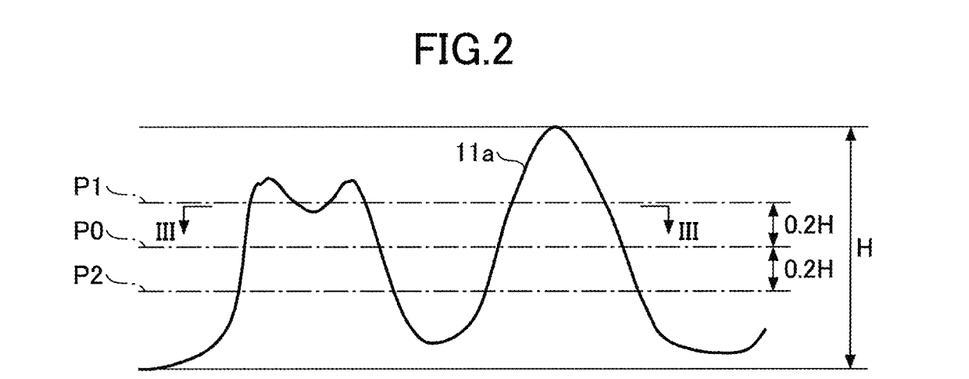
FIG. 2 is an enlarged cross sectional diagram illustrating a part of a microscopic asperity surface according to one embodiment.
Figure 3:
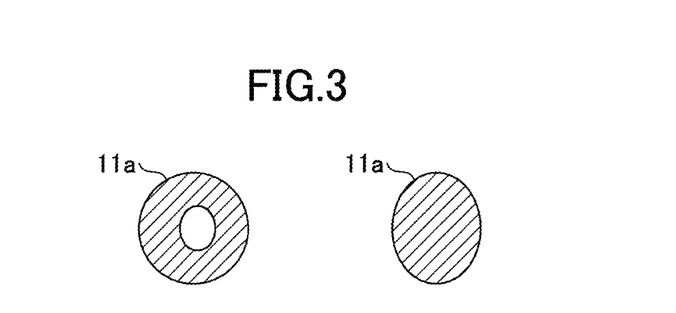
FIG. 3 is a cross sectional diagram taken along a line III-III of FIG. 2.

FIG. 2 is an enlarged cross sectional diagram illustrating a part of a microscopic asperity surface according to one embodiment. FIG. 3 is a cross sectional diagram taken along a line of FIG. 2. In a cross section at the position P1, which is higher than the reference plane P0 of the microscopic asperity surface 11a by 20% of the maximum height difference H of the microscopic asperity surface 11a, a single continuous portion (indicated by hatched portions in FIG. 3) is counted as one peak.

The maximum cross sectional area (hereinafter also simply referred to as "maximum cross sectional area of peak"), among the cross sectional areas of the respective peaks at the position P1 (e.g., a cross sectional area of a hatched portion in FIG. 3), is preferably 25,000 to 80,000 nm$^2$. Human fingers are able to feel a peak having a maximum cross sectional area of 25,000 nm$^2$ or more. Further, a peak having a maximum cross sectional area of 80,000 nm$^2$ or less will lower the haze.

In the present embodiment, the number of peaks (protrusions) is managed; however, the number of valleys (depressions) may also be managed. Specifically, in a square region, the number of valleys, which is lower than the maximum height difference of the square region by 20% or more from the reference plane of the square region (hereinafter also simply referred to as "the number of valleys"), may be in a range between 1 or more and 300 or less. The number of valleys in the square region falling within a range between 1 or more and 300 or less indicates that there are an appropriate number of valleys, thereby exhibiting an excellent finger sliding property. The number of valleys is preferably 280 or less, more preferably 250 or less, and further preferably 240 or less. In the cross section at the position P2, which is lower than the reference plane P0 of the microscopic asperity surface 11a by 20% of the maximum height difference H of the microscopic asperity surface 11a, a single continuous portion is counted as one valley. The maximum cross sectional area among the cross sectional areas of the respective valleys (hereinafter also simply referred to as the "maximum cross sectional area of valley") at the position P2 is preferably 25,000 to 80,000 nm$^2$. Human fingers are able to feel a valley that has a maximum cross sectional area of 25,000 nm$^2$ or more. Further, a valley having a maximum cross sectional area of 80,000 nm$^2$ or less will lower the haze.

According to another aspect of the present invention, the summit density Sds of the microscopic asperity surface 11a, which is obtained after a wavelength component of 0.05 μm or less is removed from the shape data of the square region having 2 μm per side in the microscopic asperity surface using an S-filter described in ISO 16610-61, is in a range between 1/μm$^2$ or more and 170/μm$^2$ or less. Note that the position of the square region may be any position of the microscopic asperity surface 11a. Noise removal processing is conducted by applying the above-described filter to an AFM image of the predetermined square region. By performing this noise removal processing, a microscopic asperity structure, which is sufficiently detectable with fingers, of the shape data may be analyzed.

The summit density Sds is density of apex protrusions. The procedure for calculating the summit density Sds is in compliance with the following Non-Patent Document 1 (K. J. Stout, P. J. Sullivan, W. P. Dong, E. Mainsah, N. Luo, T. Mathia, H. Zahouani (1994), The development of methods for the characterization of roughness in three dimensions, Publication no. EUR 15178 EN of the commission of the European communities, Luxembourg).

The summit density Sds being in a range between 1/μm$^2$ or more and 170/μm$^2$ or less indicates an adequate density of peaks (i.e., protrusions) sufficiently detectable by human fingers, which may allow a contact area between a finger and the glass plate to fall within an adequate range to provide an excellent finger sliding property. Further, the summit density Sds being 170/μm$^2$ or less may lower the haze. The summit density Sds is preferably 160/μm$^2$ or less, and more preferably 140/μm$^2$ or less.

The haze of the glass plate 10 is measured from the microscopic asperity surface 11a side. Note that "to be measured from the microscopic asperity surface 11a side" means to measure the haze by irradiating the microscopic asperity surface 11a with inspection light from a light source outside the glass plate 10. The haze of the glass plate 10 is preferably 0% or more and 2% or less. The haze of the glass plate 10 being 2% or less will not adversely affect its aesthetic appearance or will not degrade viewability when the glass plate 10 is applied to a touch pad or touch panel. The haze of the glass plate 10 is preferably 1.5% or less, and more preferably 1% or less. The lower haze of the glass plate 10 is more preferable; however, the haze of the glass plate 10 being 0.01% or more is preferable from the viewpoint of manufacturing.

Haze is measured in accordance with Japanese Industrial Standard JIS K7136. Of the transmitted light passing through the glass plate 10 in a thickness direction from a first main surface 11 toward a second main surface 12, haze is obtained as a percentage of transmitted light that is deflected by 2.5° or more from incident light by a forward scattering. As a light source used for measuring haze, a C light source is used.

The thickness of the glass plate 10 is preferably 3 mm or less; for example, the thickness of the glass plate 10 may be in a range of 0.2 to 2.0 mm. The thickness of the glass plate 10 is more preferably in a range of 0.3 to 1.5 mm. The thickness of the glass plate 10 being 3 mm or more may result in an increase in its weight, which makes it difficult to reduce its weight, and raises a raw material cost. The thickness of the glass plate 10 being 0.2 mm or less may degrade handling of the substrate.

The glass plate 10 may preferably have a Martens hardness in a range of, for example, 1000 to 5000 N/mm². The Martens hardness of the glass plate 10 being 1000 N/mm² or more will result in excellent durability. In addition, the Martens hardness of the glass plate 10 being 5000 N/mm² or less is preferable in terms of processibility of the glass plate 10. The Martens hardness of the glass plate 10 is more preferably in a range of 2000 to 5000 N/mm².

The glass plate 10 preferably has a high transmittance, for example, a transmittance of 80% or more, in a wavelength region of 400 to 700 nm.

Further, it is desirable that the glass plate 10 has sufficient insulating properties as well as high chemical and physical durability.

The glass plate 10 is formed by a float process, a fusion process, or the like. The glass plate 10 is made of soda-lime silicate glass, aluminosilicate glass, alkali-free glass or the like. The glass plate 10 may be chemically strengthened glass subjected to chemical strengthening treatment or unstrengthened glass. When the glass plate 10 is a chemically strengthened glass, the glass plate 10 contains alkali metal. The surface shape of the microscopic asperity surface hardly changes irrespective of whether or not chemical strengthening treatment being applied after the formation of the microscopic asperity surface; hence, a glass plate 10 having excellent finger sliding property and low haze will be provided irrespective of the application of chemical strengthening treatment after the formation of the microscopic asperity surface.

The glass plate 10 may contain, in mol %, 61 to 77% of $SiO_2$, 1 to 18% of $Al_2O_3$, 8 to 18% of $Na_2O$, 0 to 6% of $K_2O$, 0 to 15% of MgO, 0 to 8% of $B_2O_3$, 0 to 9% of CaO, 0 to 1% of SrO, 0 to 1% of BaO, and 0 to 4% of $ZrO_2$.

$SiO_2$ is a component constituting a framework of the glass and is essential. The content of $SiO_2$ being less than 61 mol % may make the glass susceptible to crack when the glass surface is scratched, may lower weather resistance, may increase specific weight; or may raise a liquid-phase temperature to make the glass unstable and the like. Hence, the content of $SiO_2$ may be 61 mol % or more, and may preferably be 63 mol % or more. The content of $SiO_2$ exceeding 77 mol % may raise the temperature T2 at which the viscosity of the glass becomes $10^2$ dPa·s or the temperature T4 at which the viscosity of the glass becomes $10^4$ dPa·s, which makes it difficult to melt or mold the glass, or which tends to lower weather resistance. Hence, the content of $SiO_2$ may be 77 mol % or less, and may preferably be 70 mol % or less.

$Al_2O_3$ is a component that improves ion exchange performance and weather resistance, and $Al_2O_3$ is thus essential. The content of $Al_2O_3$ being less than 1 mol % may make it difficult to obtain a desired surface compressive stress or desired compressive stress layer thickness by ion exchange, or may make glass susceptible to lowering weather resistance. Hence, the content of $Al_2O_3$ may be 1 mol % or more, and may preferably be 5 mol % or more. The content of $Al_2O_3$ being more than 18 mol % may raise temperature T2 or T4, making it difficult to melt or mold glass, or may raise a liquid-phase temperature, making the glass susceptible to devitrification. Hence, the content of $Al_2O_3$ may be 18 mol % or less.

$Na_2O$ is a component that reduces variability in surface compressive stress at the time of ion exchange, forms a surface compressive stress layer by ion exchange, or improves the meltability of glass. $Na_2O$ is thus essential. The content of $Na_2O$ being less than 8 mol % may make it difficult to form a desired surface compressive stress layer by ion exchange, or may raise temperature T2 or T4 to make glass difficult to melt or make glass difficult to be molded. Hence, the content of $Na_2O$ may be 8 mol % or more, and may preferably be 10 mol % or more. The content of $Na_2O$ being more than 18 mol % may lower weather resistance or may make glass susceptible to crack due to indentation. Hence, the content of $Na_2O$ is 18 mol % or less.

$K_2O$ is not essential; however, $K_2O$ is a component that increases the ion exchange rate; the allowable content of $K_2O$ may thus be up to 6 mol %. The content of $K_2O$ exceeding 6 mol % may increase the variability in the surface compressive stress at the time of ion exchange, making glass susceptible to crack due to indentation, or may lower weather resistance.

MgO is a component improving meltability and may thus be contained in the glass. The content of MgO exceeding 15 mol % may increase variability in the surface compressive stress at the time of ion exchange, may raise the liquid-phase temperature, may make glass susceptible to devitrification, or may decrease the ion exchange rate. The content of MgO is thus 15 mol % or less, and preferably 12 mol % or less.

$B_2O_3$ is preferably 8 mol % or less in order to improve meltability. The content of $B_2O_3$ exceeding 8 mol % may make it difficult to obtain homogeneous glass, resulting in being difficult to mold glass. The allowable content of CaO may be up to 9 mol % in order to improve the meltability at high temperature or to lower the susceptibility to devitrification; however, such a content of CaO may have a risk of increasing the variability in the surface compressive stress at the time of ion exchange, may have a risk of lowering the ion exchange rate or may have a risk of lowering the resistance to crack.

The allowable content of SrO may be 1 mol % or less in order to improve the meltability at high temperature or to lower the susceptibility to devitrification; however, such a content of SrO may have a risk of increasing the variability in the surface compressive stress at the time of ion exchange, may have a risk of lowering the ion exchange rate or may have a risk of lowering the resistance to crack.

The allowable content of BaO may be 1 mol % or less in order to improve the meltability at high temperature or to lower the susceptibility to devitrification; however, such a content of BaO may have a risk of increasing the variability in the surface compressive stress at the time of ion exchange, may have a risk of lowering the ion exchange rate or may have a risk of lowering the resistance to crack.

$ZrO_2$ is not an essential component; however, the allowable content of $ZrO_2$ may be up to 4 mol % for increasing surface compressive stress or for improving weather resistance. The content of $ZrO_2$ exceeding 4 mol % may increase the variability in the surface compressive stress at the time of ion exchange, or may lower the resistance to crack.

Laminate

Figure 4:
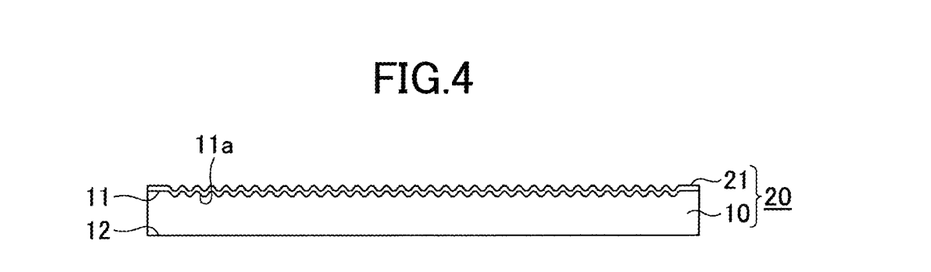
FIG. 4 is a diagram illustrating a laminate according to one embodiment.

FIG. 4 is a diagram illustrating a laminate according to one embodiment. A laminate 20 includes a glass plate 10 illustrated in FIG. 1 and an antifouling layer 21 at least a part of which is formed on the microscopic asperity surface 11a of the glass plate 10. The antifouling layer 21 may be formed on at least a part of the microscopic asperity surface 11a. In a case where the microscopic asperity surface 11a is formed only on a part of the first main surface 11, the antifouling layer 21 may or may not be formed on a remaining part of the first main surface 11. The following mainly illustrates the antifouling layer 21.

Antifouling Layer

The antifouling layer 21 is configured to prevent stains such as fingerprints, and fats and oils from adhering to the glass or to facilitate removal of such stains from the glass. The antifouling layer 21 has at least one of fingerprint adhesion prevention function and fingerprint removal enhancement function. The antifouling layer 21 is composed of aggregates of resin bristles extending perpendicularly or diagonally from the main surface of the glass plate 10, for example.

The antifouling layer 21 is formed of a resin containing fluorine. As the material of the antifouling layer 21, for example, a resin represented by the following formula (A), a resin represented by the following formula (B), or the like may be used.

[Chemical 1]

$$F\text{---}(CF_2CF_2CF_2O)_k\text{---}L_1\text{---}Si\text{---}(L_0)_3 \quad (A)$$

In the formula (A), $L_1$ is a bonding structure composed of, for example, an ether bond, an amide bond or the like, which is formed, for example, from C, H, O, N, F or the like. k represents the number of repetitions, which is a natural number between 1 or more and 1000 or less. $L_0$ is a hydrolyzable group, which is exchangeable with a terminal OH group of the glass.

$L_0$ is preferably a halogen other than fluorine or an alkoxy group (—OR), where R is a linear or branched hydrocarbon with 1 to 6 carbon atoms, such as a hydrocarbon with —$CH_3$, —$C_2H_5$ or —$CH(CH_3)_2$. A preferred halogen is chlorine. A preferred alkoxy group is trimethoxysilyl group, $Si(OMe)_3$.

[Chemical 2]

$$CF_3O\text{---}(CF_2O)_m\text{---}(CF_2CF_2O)_n\text{---}L_2\text{---}Si\text{---}(L_0)_3 \quad (B)$$

In the formula (B), $L_2$ is a bonding structure composed of, for example, an ether bond, an amide bond or the like, formed from C, H, O, N, F or the like. m and n represent the number of repetitions, each of which is a natural number between 1 or more and 1000 or less. $L_0$ has the same representation as $L_0$ in formula (A).

Preferable examples of a material used for the antifouling layer 21 include S600 (trade name, manufactured by Asahi Glass Co., Ltd.), S550 (trade name, manufactured by Asahi Glass Co., Ltd.), KY-178 (trade name, manufactured by Shin-Etsu Chemical Co., Ltd.), KY-185 (trade name, manufactured by Shin-Etsu Chemical Co., Ltd.), X-71-186 (trade name, manufactured by Shin-Etsu Chemical Co., Ltd.), X-71-190 (trade name, manufactured by Shin-Etsu Chemical Co., Ltd.), X-195 (trade name, manufactured by Shin-Etsu Chemical Co., Ltd.), Optool (registered trademark) DSX (trade name, manufactured by Daikin Industries, Ltd.) and Optool (registered trademark) AES (trade name, manufactured by Daikin Industries, Ltd.)

The thickness of the antifouling layer 21 is, for example, 1 to 100 nm.

The surface shape of the antifouling layer 21 follows the surface shape of the microscopic asperity surface 11a of the glass plate 10. Hence, according to the laminate including the glass plate 10 and the antifouling layer 21, similar to the glass plate 10, a finger sliding property may be improved and haze may be lowered.

The visible light reflectance Rv of the laminate 20 is measured from the antifouling layer 21 side. Note that "to be measured from the antifouling layer 21 side" means to measure the visible light reflectance Rv of the laminate 20 by irradiating the antifouling layer 21 with inspection light from a light source outside the laminate 20. The visible light reflectance Rv of the laminate 20 is preferably in a range of 0 to 3%, and is more preferably in a range of 0 to 2.5%. Note that the visible light reflectance Rv of the laminate 20 is a mean value of the reflectance at a wavelength of 450 to 600 nm.

Modification of Laminate

Figure 5:
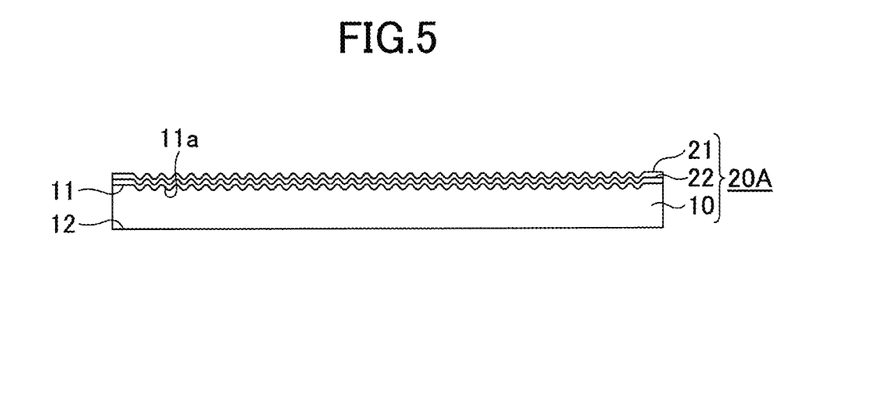
FIG. 5 is a diagram illustrating a laminate according to a modification.

FIG. 5 is a diagram illustrating a laminate according to one embodiment. As illustrated in FIG. 5, the laminate 20A according to the present modification has an intermediate layer 22 between the glass plate 10 and the antifouling layer 21. The following mainly illustrates the intermediate layer 22.

Intermediate Layer

The intermediate layer 22 is a functional layer configured to exert at least one function of a low reflection function, a high adhesion function, a low emission function, a heat insulation function and the like in the laminate 20A. The intermediate layer 22 may, though not particularly specified, include at least one of an oxide layer, a nitride layer, an oxynitride layer, and a metal layer. The intermediate layer 22 may be composed of a single layer or may be composed of two or more layers. The material of the intermediate layer 22 is not particularly specified, and the intermediate layer 22 may be formed by a method known in the art such as a dry process or a wet process.

The intermediate layer 22 may include a low reflective layer. The low reflective layer is composed of multiple layers having different refractive indices. Materials of each layer may include titanium oxide, tantalum oxide, niobium oxide, silicon nitride, aluminum nitride, silica, and the like. The low reflective layer may be formed by alternately laminating layers having different refractive indices. For example, the low reflective layer may have a repeating structure of a first layer containing niobium oxide (or titanium oxide) and a second layer containing silica.

The intermediate layer 22 may include an underlayer. The underlayer has an effect of improving the adhesion between the glass plate 10 and the antifouling layer 21 and the like. The underlayer may be formed of silicon oxide or the like, for example.

In a case of the intermediate layer 22 having both an under layer and another layer (e.g., a low reflective layer), the intermediate layer 22 may have a low reflective layer and an underlying layer in this order from the glass plate 10 side.

The thickness of the intermediate layer 22 is, for example, 1 to 100 nm.

The surface shape of the intermediate layer 22, and eventually the surface shape of the antifouling layer 21, follows the surface shape of the microscopic asperity surface 11a of the glass plate 10. Hence, according to the laminate 20A including the glass plate 10, the intermediate layer 22 and the antifouling layer 21, similar to the glass plate 10, finger sliding property may be improved and haze may be lowered.

Touch Pad

Figure 6:
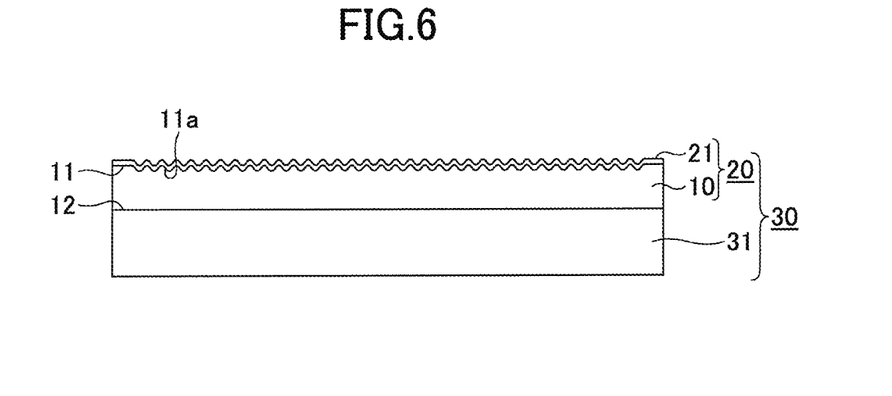
FIG. 6 is a diagram illustrating a touch pad using a laminate according to one embodiment.

FIG. 6 is a diagram illustrating a touch pad using a laminate according to one embodiment.

The touch pad 30 has a laminate 20 and a position detector 31. The position detector 31 may be a general position detector, and is configured to detect a touch position of a finger on the laminate 20, for example, by utilizing a change in electrostatic capacitance or the like.

Since the touch pad 30 includes the laminate 20, it is possible to improve finger sliding property and to lower haze. The touch pad 30 may be incorporated in, for example, a laptop computer or the like.

Note that the touch pad 30 may have the laminate 20A depicted in FIG. 5 instead of the laminate 20 depicted in FIG. 4.

Touch Panel

Figure 7:
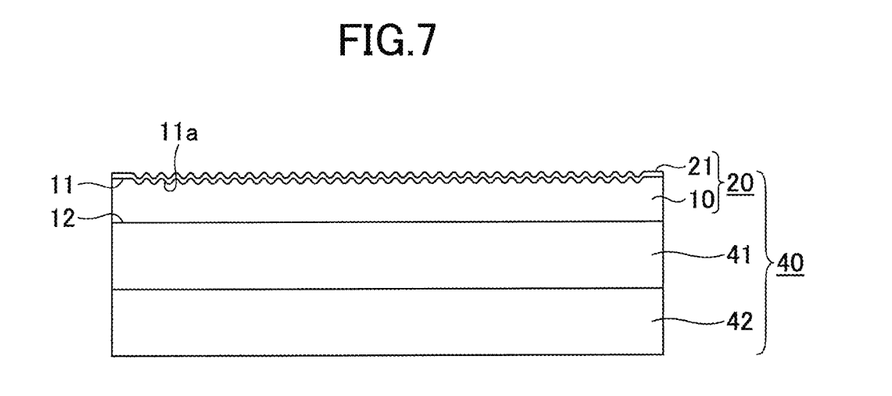
FIG. 7 is a diagram illustrating a touch panel using a laminate according to one embodiment.

FIG. 7 is a diagram illustrating a touch panel using a laminate according to one embodiment.

The touch panel 40 includes a laminate 20, a position detector 41, and an image display device 42. The position detector 41 may be a general position detector, and is configured to detect a touch position of a finger on the laminate 20, for example, by utilizing a change in electrostatic capacitance or the like. The image display device 42 may be a general image display device that is composed, for example, of a liquid crystal display or the like, and is configured to display an image corresponding to the detection result of the position detector 41.

Note that the position detector 41 and the image display device 42 may be arranged in the opposite positions, and the position detector 41 may be disposed on the opposite side of the laminate 20 with respect to the image display device 42.

Since the touch panel 40 includes the laminate 20, it is possible to improve finger sliding property and to lower haze. The touch panel 40 may be incorporated in, for example, a digital information device. Examples of the digital information device include a mobile phone (including a smartphone), a computer (including a tablet), a copier, a facsimile, and the like.

Note that the touch panel 40 may have the laminate 20A depicted in FIG. 5 instead of the laminate 20 depicted in FIG. 4.

Note that the laminate 20 depicted in FIG. 4 or the laminate 20A depicted in FIG. 5 may be incorporated in a product other than the touch pad 30 and the touch panel 40. For example, the laminate 20 depicted in FIG. 4 or the laminate 20A depicted in FIG. 5 may be used for a housing of a device, a cover of an image display device, and the like.

In addition, the laminate 20 depicted in FIG. 4 or the laminate 20A depicted in FIG. 5 is not necessarily touched with a finger but may be touched with a pen. In this configuration, a predetermined writability may be obtained with still having a low haze.

Manufacturing Method of Laminate

Figure 8:
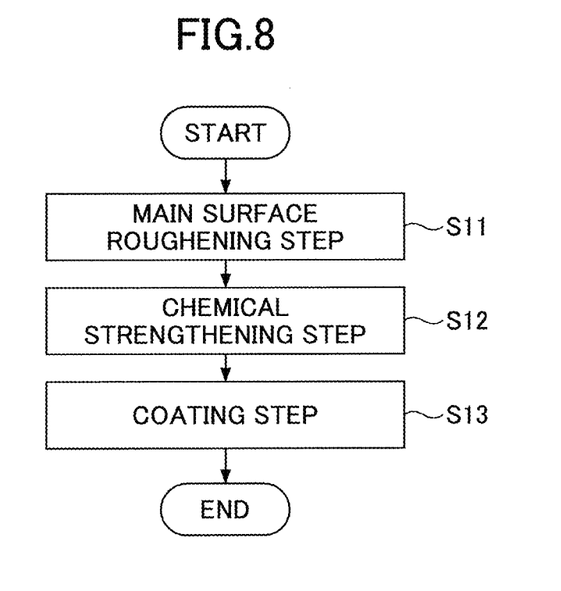
FIG. 8 is a flowchart illustrating a method of manufacturing a laminate according to one embodiment.

FIG. 8 is a flowchart illustrating a method of manufacturing a laminate according to one embodiment. As illustrated in FIG. 8, a method of manufacturing a laminate includes a main surface roughening step S11, a chemical strengthening step S12, and a coating step S13. Note that the chemical strengthening step S12 and the coating step S13 are optional steps and may be provided as required.

Main Surface Roughening Step S11

The main surface roughening step S11 includes roughening the first main surface 11 of the glass plate 10 to form a microscopic asperity surface 11*a*. The surface roughness Ra of the microscopic asperity surface 11*a* is in a range of 0.3 to 100 nm.

For example, the main surface roughening step S11 includes etching the main surface of the glass plate 10. The etching may be either wet etching or dry etching.

The etching method is not particularly specified; however, in the dry etching method, for example, a CVD method, a plasma CVD method, a reactive ion etching (RIE) method, an inductively coupled plasma (ICP) method, a reverse sputtering method, an ion milling method, a laser ion source (LIS) method, or the like may be used, or a combination of these methods may be used.

In a case of using a liquid, a treatment liquid may be supplied in liquid form as, for example, by spray coating, or may be supplied to the surface after vaporizing the liquid.

These etchants may contain, for example, molecules in which fluorine atoms are present in the structure of the molecules, and specifically include, but are not limited to, hydrogen fluoride (HF), hydrofluoric acid, fluorine as a simple substance, trifluoroacetic acid, carbon tetrafluoride, silicon tetrafluoride, phosphorus pentafluoride, phosphorus trifluoride, boron trifluoride, nitrogen trifluoride, chlorine trifluoride, and the like. These etchants may also be diluted with other liquids or gases as required. Two or more of these liquids and gases may be mixed for use.

The etchant may contain liquids or gases other than the liquids and gases above, and is not particularly specified; however, preferable liquids or gases do not react with molecules having fluorine atoms at room temperature. Preferable examples of such liquids or gases include, but are not limited to, $N_2$, air, $H_2$, $O_2$, Ne, Xe, $CO_2$, Ar, He, Kr, and the like. Two or more of these gases may be mixed for use. It is preferable to use an inert gas such as $N_2$, argon or the like as a carrier gas of a gas containing a molecule having fluorine atoms in its structure.

Furthermore, the etchant may contain water vapor or water. The etchant may also include $SO_2$.

The temperature for the etching treatment is not particularly limited, but the dry etching treatment under atmospheric pressure by a chemical reaction is usually carried out in a range of 300 to 800° C. The temperature for the etching treatment is preferably in a range of 400 to 700° C., and more preferably in a range of 450 to 650° C.

A treatment gas used for the etching treatment contains hydrogen fluoride gas, for example. The treatment gas used for the etching treatment may further contain a carrier gas and/or diluent gas. The carrier gas and the diluent gas are not particularly specified, but the carrier gas and the diluent gas may, for example, be an inert gas such as nitrogen and/or argon. The carrier gas and the diluent gas that include a carrier gas and/or a diluent gas may facilitate management of the manufacturing conditions.

In addition, the treatment gas may further contain water vapor (water in a gaseous state). The treatment gas having the water vapor may ease the reaction between the hydrogen fluoride gas and the glass, and may facilitate management of the surface shape of the microscopic asperity surface 11*a*. Further, the treatment gas having the water vapor may facilitate controlling the shape with excellent stability and reproducibility. In the treatment gas having water vapor, the volume ratio (V1/V2) of the amount (V1) of water vapor to the amount (V2) of hydrogen fluoride gas being 10 or less is preferable in view of securing hydrogen fluoride necessary for controlling the surface shape. Accordingly, a microscopic asperity surface 11*a* having a desired surface shape may be obtained.

The concentration of hydrogen fluoride gas in the treatment gas is not particularly specified insofar as the main surface of the glass plate is properly etched. The concentration of hydrogen fluoride gas in the treatment gas is, for example, in a range of 0.1 to 10 vol %, preferably in a range of 0.3 to 5 vol %, and is more preferably in a range of 0.5 to 4 vol %. In this case, the concentration (vol %) of the hydrogen fluoride gas in the treatment gas is calculated by dividing the hydrogen fluoride gas flow rate by the sum of the hydrogen fluoride gas flow rate, the carrier gas flow rate, the diluent gas flow rate, and the water vapor flow rate.

The etching treatment of the glass plate may be carried out in a reaction vessel; however, in a case of a larger glass plate or the like, the etching treatment of the glass plate may be carried out while the glass plate is conveyed. In this case, etching may be performed more rapidly and more efficiently than the etching performed in the reaction vessel.

The following briefly describes an example of a device that may be used for the etching treatment.

Figure 9:
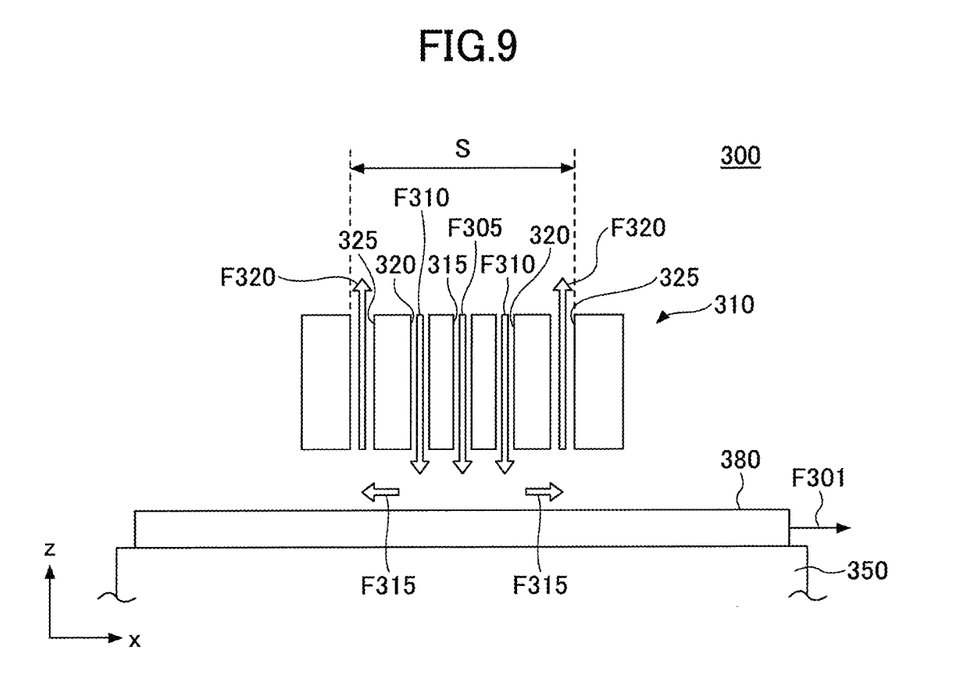
FIG. 9 is a diagram illustrating a treatment apparatus used for etching a glass plate according to one embodiment.

FIG. 9 is a diagram illustrating a treatment apparatus used for etching a glass plate according to one embodiment. In the treatment apparatus depicted in FIG. 9, etching of a glass plate may be performed while a glass plate is transferred.

As illustrated in FIG. 9, the treatment apparatus 300 includes an injector 310 and a transfer unit 350.

The transfer unit 350 is capable of transferring the glass plate 380 placed on the top of the transfer unit 350 in a horizontal direction (x-axis direction) as indicated by an arrow F301.

The injector 310 is disposed above the transfer unit 350 and the glass plate 380. The injector 310 has multiple slits 315, 320, and 325 which act as flow paths for the treatment gas. Specifically, the injector 310 includes a first slit 315 provided along a vertical direction (z-axis direction) at a central portion of the injector 310, second slits 320 provided along the vertical direction (z-axis direction) so as to surround the first slit 315 and third slits 325 provided along the vertical direction (z-axis direction) so as to surround the second slits 320.

One end (upper part) of the first slit 315 is connected to a hydrogen fluoride gas source (not illustrated), a carrier gas source (not illustrated) and a water vapor source (not illustrated), and the other end (lower part) of the first slit 315 is oriented toward the glass plate 380. Similarly, one end (upper part) of the second slits 320 is connected to a diluent gas source (not illustrated) and a water vapor source (not illustrated), and the other end (lower part) of the second slits 320 is oriented toward the glass plate 380. One end (upper part) of the third slits 325 is connected to an exhaust system (not illustrated), and the other end (lower part) of the third slits 325 is oriented toward the glass plate 380. Water vapor may flow from either the first slit 315 or the second slits 320.

When etching treatment of the glass plate 380 is performed using the treatment apparatus 300 configured as described above, hydrogen fluoride gas is first supplied from a hydrogen fluoride gas source (not illustrated) via the first slit 315 in the direction of arrow F305. Further, a diluent gas such as nitrogen is supplied from a diluent gas source (not illustrated) via the second slits 320 in the direction of arrow F310. These gases are discharged to the outside of the treatment apparatus 300 via the third slits 325 after moving in the horizontal direction (x-axis direction) along the arrow F315 by the exhaust system.

In addition to the hydrogen fluoride gas, a carrier gas such as nitrogen and/or water vapor may be simultaneously supplied to the first slit 315.

Next, the transfer unit 350 is operated. As a result, the glass plate 380 moves in the direction of the arrow F301.

While passing through the lower side of the injector 310, the glass plate 380 comes in contact with the treatment gas supplied from the first slit 315 and the second slits 320 (e.g., a mixture of hydrogen fluoride gas, a carrier gas, a diluent gas, and water vapor). As a result, the upper surface of the glass plate 380 is etched.

Note that the treatment gas supplied to the upper surface of the glass plate 380 moves as indicated by an arrow F315 and is used for the etching treatment, and then moves as indicated by an arrow F320 to be discharged via third slits 325 to the outside of the treatment apparatus 300.

By using such a treatment apparatus 300, it is possible to perform an etching treatment using a treatment gas while transferring a glass plate. In this case, the treatment efficiency may be improved compared with the method of performing the etching treatment using the reaction vessel. In addition, when such a treatment apparatus 300 is used, it is possible to perform etching treatment on a large glass plate.

Note that the supply rate of the treatment gas to the glass plate 380 is not particularly specified. The supply rate of the treatment gas may be, for example, in a range of 0.1 to 1000 SLM. Here, SLM is an abbreviation for Standard Liter per Minute (flow rate in the standard state). The passing time of the glass plate 380 through the injector 310 (time passing through the distance S in FIG. 9) is in a range of 1 to 120 seconds, preferably in a range of 2 to 60 seconds, and more preferably in a range of 3 to 30 seconds. By setting the passing time of the glass plate 380 through the injector 310 to 120 seconds or less, rapid etching treatment may be achieved. Hereinafter, the passage time of the glass plate 380 through the injector 310 is also referred to as "etching treatment time".

As described above, by using the treatment apparatus 300, it is possible to perform etching treatment on the glass plate while the glass plate is transferred.

The treatment apparatus 300 illustrated in FIG. 9 is merely an example, and etching treatment of a glass plate with a treatment gas containing hydrogen fluoride gas may be performed using another apparatus. For example, in the treatment apparatus 300 of FIG. 9, the glass plate 380 relatively moves with respect to the stationary injector 310. However, contrary to this, the injector may be moved in the horizontal direction with respect to the stationary glass plate. Alternatively, both the glass plate and the injector may be moved in mutually opposite directions. Further, an injector may be installed below the transfer unit 350 and the glass plate to etch the lower surface of the glass.

Further, in the treatment apparatus 300 of FIG. 9, the injector 310 has three slits 315, 320, and 325 in total. The number of slits is not particularly specified. For example, the number of slits may be two. In this case, one slit may be used for supplying a treatment gas (e.g., a mixed gas of a carrier gas, a hydrogen fluoride gas, a diluent gas, and water vapor), and another slit may be used for discharge of the treatment gas. One or more slits may be provided between the slit 320 and the exhaust slit 325 to supply the etching gas, the carrier gas, the diluent gas, and/or the water vapor.

Furthermore, in the treatment apparatus 300 of FIG. 9, the second slits 320 of the injector 310 are disposed so as to surround the first slit 315, and the third slits 325 are provided so as to surround the first slit 315 and the second slits 320. Alternatively, the first slit, the second slit, and the third slit may be arranged in a row along the horizontal direction (the x axis direction). In this case, the treatment gas moves along the upper surface of the glass plate in one direction, and then is discharged through the third slit.

Furthermore, two or more injectors 310 may be arranged on the transfer unit 350 along the horizontal direction (x-axis direction).

Further, a layer containing silicon oxide as a main component may be laminated on the same surface as the etched surface by another apparatus or the like. By laminating the layers, the chemical durability of the etched surface may be improved.

By applying a mask on the glass plate in advance and subsequently etching the glass plate, it is possible to partially etch a desired region of the main surface of the glass plate or to apply different etching conditions depending on different regions of the glass plate.

Chemical Strengthening Step S12

The chemical strengthening step S12 includes chemically strengthening the glass plate. Note that the "chemical strengthening treatment (method)" is a generic term for technologies for immersing a glass plate in a molten salt containing alkali metal to replace an alkali metal (ion) having a small atomic diameter present on the outermost surface of the glass plate with an alkali metal (ion) having a large atomic diameter present in the molten salt. In the "chemical strengthening treatment (method)", alkali metal (ion) having an atomic diameter larger than that of the original atom before the chemical strengthening treatment is arranged on the surface of the treated glass plate. As a result, a compressive stress layer is formed on the surface of the glass plate, thereby improving the strength of the glass plate.

For example, when the glass plate contains sodium (Na), the sodium is replaced with, for example, potassium (K) in a molten salt (e.g., nitrate) during the chemical strengthening process. Alternatively, for example, in a case of the glass plate containing lithium (Li), the lithium may be replaced with, for example, sodium (Na) and/or potassium (K) in a molten salt (e.g., nitrate) during the chemical strengthening process.

The conditions for the chemical strengthening treatment performed on the glass plate are not particularly specified.

Examples of types of the molten salt include alkali metal nitrate, alkali metal sulfate, alkali metal chloride salt and the like of sodium nitrate, potassium nitrate, sodium sulfate, potassium sulfate, sodium chloride, potassium chloride and the like. These molten salts may be used alone or in combination of two or more types.

The treatment temperature (the temperature of the molten salt) varies depending on the type of the molten salt to be used, but may be in a range of 350 to 550° C., for example.

The chemical strengthening treatment may be performed, for example, by immersing the glass plate in molten potassium nitrate salt at 350 to 550° C. for approximately 2 minutes to 20 hours. From the viewpoint of economical and practical use, the chemical strengthening treatment is preferably performed at 350 to 500° C. for 1 to 10 hours.

Performing the chemical strengthening treatment in such a condition may provide a glass plate on which a compression stress layer is formed.

As described above, the chemical strengthening step S12 is not a mandatory step. However, performing the chemical strengthening treatment on the glass plate will increase the strength of the glass plate. The surface shape of the microscopic asperity surface scarcely changes depending on whether or not chemical strengthening treatment is applied on the glass plate. Hence, the finger sliding property may be improved and haze may be lowered even after the application of the chemical strengthening treatment.

Coating Step S13

The coating step S13 includes an AFP (Anti-Finger Print) treatment for coating the microscopic asperity surface of the glass plate with a material of an antifouling layer.

The material of the antifouling layer used in the AFP treatment is a fluorine-based silane coupling agent containing a functional group bonded to a Si—OH group on the main surface of a glass plate or the like and fluorine. The material for the antifouling layer condenses with a Si—OH group present on the main surface of the glass plate, thereby ensuring adhesion to the substrate.

As a material for the antifouling layer, any materials known in the art may be used, such as a compound of the above-described chemical formula (A) or (B).

These materials may be used alone or in combination. Further these materials may be used after preparing a hydrolysis condensate partially in advance with an acid, an alkali or the like.

The AFP treatment may be performed by a dry process or a wet process. In the dry process, the material for the antifouling layer is formed on a glass plate by a film forming process such as a vapor deposition method. In the wet process, a solution containing the material for the antifouling layer is applied to a glass plate, and then the glass plate is dried.

Prior to the AFP treatment, the glass plate may be subjected to cleaning or undercoating as required. After the AFP treatment, a heat treatment, a humidification treatment and the like may be applied in order to improve the adhesion of the antifouling layer.

The coating step may further include an intermediate layer forming process for coating the material for the intermediate layer with respect to the microscopic asperity surface of the glass plate. The intermediate layer forming process is performed before the AFP treatment.

In the intermediate layer forming process, the intermediate layer 22 is formed on the microscopic asperity surface 11a of the glass plate 10.

The intermediate layer 22 may be formed by, for example, a dry process or a wet process. In the dry process, each layer is sequentially formed on the microscopic asperity surface 11a of the glass plate 10 by a "dry" film forming process, thereby forming the intermediate layer 22 having a single/multilayer structure.

Examples of the "dry" film forming process include a sputtering method, an evaporation method such as electron beam vapor deposition and resistance heating, a plasma CVD method, a CVD method, and the like.

Note that heat treatment or plasma treatment may be performed during and/or after the deposition of part or all of the layers.

EXAMPLES

In Examples 1 to 5, and Comparative Examples 6 and 7, the surface shape of the microscopic asperity surface was controlled by controlling the treatment conditions for etching the glass plate, and the finger sliding property and haze of the microscopic asperity surface of the glass plate were evaluated. Examples 1 to 5 are examples, and examples 6 to 7 are comparative examples.

Type of Glass Plate

A glass plate having a thickness of 0.7 mm formed by the float method was prepared. As glass types of the glass plate, Glass A was used in Examples 1, 3 to 5, and in Comparative Examples 6 and 7, and Glass B was used in Example 2. Glass A is aluminosilicate glass (Dragon Trail (registered trademark) manufactured by Asahi Glass Co., Ltd.). Glass B is soda lime glass (AS manufactured by Asahi Glass Co., Ltd.).

Etching Treatment of Glass Plate

For the etching treatment of the glass plate, the treatment apparatus 300 depicted in FIG. 9 was used.

Hydrogen fluoride gas, nitrogen gas and water vapor were supplied to the first slit 315 in Examples 1 to 5, and hydrogen fluoride gas and nitrogen gas were supplied in Comparative Examples 6 and 7. In Comparative Examples 6 and 7, water vapor was not supplied from the first slit 315.

Nitrogen gas was supplied to the second slits 320 in all of Examples 1 to 5 and Comparative Examples 6 and 7.

The concentration of hydrogen fluoride gas (HF gas) was 0.6 vol % in Example 1, 0.7 vol % in Example 2, 1.0 vol % in Example 3, 1.0 vol % in Example 4, 0.7 vol % in Example 5, 0.4 vol % in Comparative Example 6, and 0.5 vol % in Comparative Example 7.

In Examples 1 to 5, the volume ratio (V1/V2) of the amount of water vapor (V1) to the amount (V2) of hydrogen fluoride gas was set to 1/10. In Comparative Examples 6 and 7, water vapor was not supplied from the first slit 315.

The amount of exhaust gas from the third slits 325 was twice the total amount of gas supplied in all of Examples 1 to 5 and Comparative Examples 6 and 7.

The temperature of the glass plate during the etching treatment was 580° C. in Examples 1, 4 and 5, and in Comparative Examples 6 and 7, and the temperature of the glass plate was 560° C. in Examples 2 to 3. Note that the temperature of the glass plate is a value measured while transferring the same type of glass plate provided with a thermocouple under similar heat treatment conditions. Note that the temperature of the glass plate may be measured using a radiation thermometer.

The etching treatment time was 10 seconds in all of Examples 1 to 5 and Comparative Examples 6 and 7.

Surface Roughness and Maximum Height Difference

The surface roughness Ra and the maximum height difference H of the microscopic asperity surface were measured with a scanning probe microscope (SPI 3800N: manufactured by SII Nano Technology Inc.). In the measurement, an AFM image was acquired by setting the number of acquiring data of 512×512 and setting the scanning frequency of 0.3 Hz in the square region having 2 µm per side in the microscopic asperity surface. For the surface roughness Ra, the mean value of the acquired data was employed.

Figure 10:
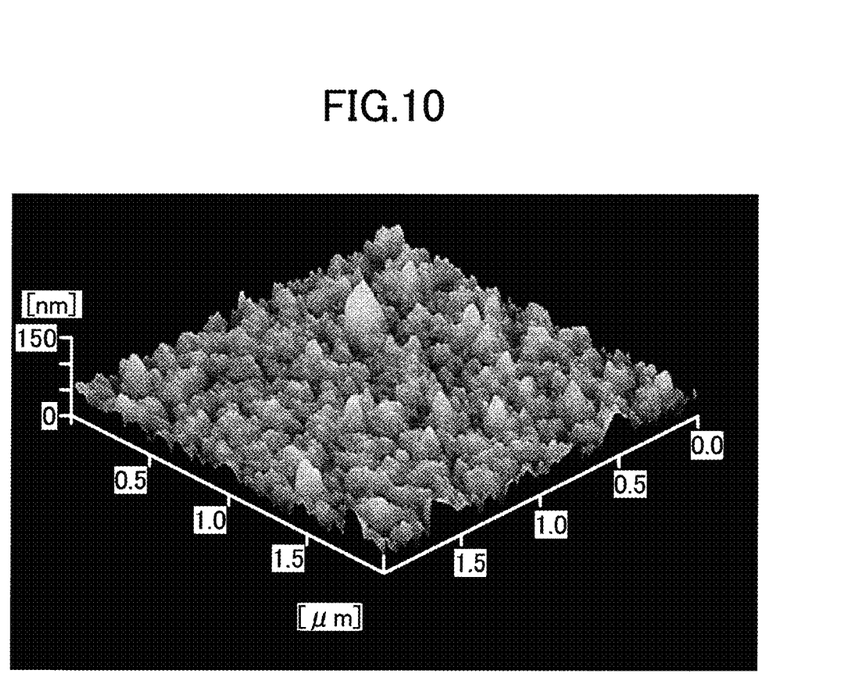
FIG. 10 is an AFM image of a square region of a microscopic asperity surface of a glass plate according to Example 3.
Figure 11:
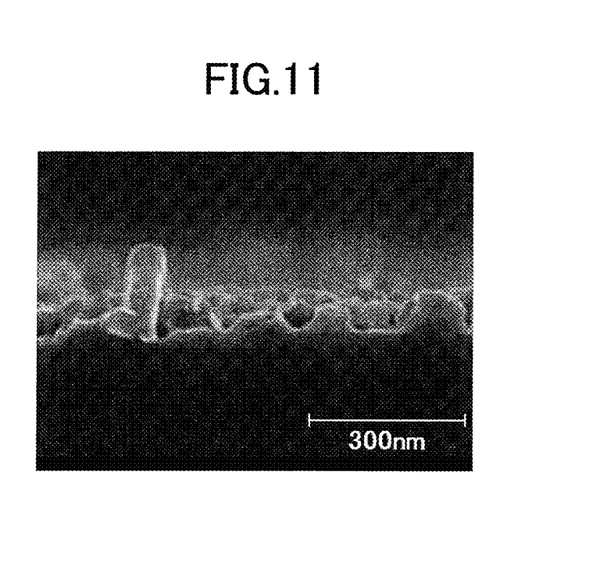
FIG. 11 is a cross sectional SEM image of a microscopic asperity surface of a glass plate according to Example 4.

As an example given, FIG. 10 is an AFM image of a square region of a microscopic asperity surface of a glass plate according to Example 3. As an example given, FIG. 11 is a cross sectional SFM image of a microscopic asperity surface of a glass plate according to Example 4.

Number of Peaks and Maximum Cross Sectional Area of Peak

The number of peaks and the maximum cross sectional area of a peak in the square region of the microscopic asperity surface were measured by analyzing an AFM image, which was used for measuring the surface roughness Ra and the maximum height difference H, by using SPIP™ manufactured by Image Metrology (Scanning Probe Image Processor).

Summit Density

The summit density (Sds) of the microscopic asperity surface was measured by applying an S-filter described in the international standard ISO 16610-61 to an AFM image used for measuring the surface roughness Ra and the maximum height difference H, and removing a wavelength component of 0.05 µm or less from the AFM image.

Finger Sliding Property

The finger sliding property of the microscopic asperity surface was evaluated by a sensory test. An excellent finger sliding property was defined as "A", and a poor finger sliding property was defined as "B".

Haze

The haze of the glass plate was measured using a haze meter (HZ-2: Suga test machine) in accordance with Japanese Industrial Standard JIS K7361. The haze of the glass plate was measured from the microscopic asperity surface side. As the light source, a C light source was used.

Reflectance

The visible light reflectance of the laminate may be calculated as a mean value of a wavelength of 450 to 600 nm by using a spectrophotometer (U-4100 type: manufactured by Hitachi, Ltd.) for measurement. Note that this visible light reflectance is measured from the antifouling layer side of the laminate by blackening the opposite surface so as not to be affected by the surface opposite to the antifouling layer of the laminate.

Overview

The evaluation results are indicated in Table 1 together with etching treatment conditions and the like.

TABLE 1

| | ETCHING TREATMENT | | | | MICROSCOPIC ASPERITY SURFACE | | | | | EVALUATION | |
|---|---|---|---|---|---|---|---|---|---|---|---|
| | GLASS PLATE GLASS TYPE | TEMPERATURE (° C.) | HF CONCENTRATION (vol %) | ADDITION OF WATER VAPOR | SURFACE ROUGHNESS Ra (nm) | MAXIMUM HEIGHT DIFFERENCE H (nm) | NUMBER OF PEAKS (COUNT) | MAXIMUM CROSS SECTION OF PEAKS (nm$^2$) | SUMMIT DENSITY (1/µm$^2$) | FINGER SLIDING PROPERTY | HAZE (%) |
| EXAMPLE 1 | GLASS A | 580 | 0.6 | PRESENCE | 6.4 | 85.2 | 270 | 25428 | 167 | A | 0.06 |
| EXAMPLE 2 | GLASS B | 560 | 0.7 | PRESENCE | 10.2 | 135.1 | 146 | 28846 | 127 | A | 0.06 |
| EXAMPLE 3 | GLASS A | 560 | 1.0 | PRESENCE | 9.0 | 144.4 | 34 | 77244 | 112 | A | 0.17 |
| EXAMPLE 4 | GLASS A | 580 | 1.0 | PRESENCE | 14.1 | 172.9 | 93 | 62821 | 95 | A | 0.25 |
| EXAMPLE 5 | GLASS A | 580 | 0.7 | PRESENCE | 14.3 | 193.4 | 217 | 34848 | 135 | A | 0.09 |
| COMPARATIVE EXAMPLE 6 | GLASS A | 580 | 0.4 | ABSENCE | 2.6 | 24.9 | 341 | 21282 | 177 | B | 0.04 |
| COMPARATIVE EXAMPLE 7 | GLASS A | 580 | 0.5 | ABSENCE | 5.8 | 66.0 | 545 | 11973 | 204 | B | 0.06 |

Table 1 clearly indicates that according to Examples 1 to 5, as a result of water vapor being added to the etching treatment gas, the number of peaks in the square region was within a range of 1 to 300, and the summit density was within a range of 1 to 170/$\mu m^2$.

These results indicate that in Examples 1 to 5, an excellent finger sliding property and the lowered haze were obtained. By contrast, according to Comparative Examples 6 and 7, water vapor was not added to the etching gas; hence, the number of peaks in the square region exceeded 300, and the summit density exceeded 170/$\mu m^2$. These results indicate that in Comparative Examples 6 and 7, a poor finger sliding property was obtained. The results did not significantly change according to the presence or absence of the antifouling layer, the intermediate layer, chemical strengthening treatment, and the like.

Advantageous Effect of Invention

According to one embodiment of the present invention, it is possible to provide a glass plate having an excellent finger slip property and low haze without providing a functional layer.

The embodiments and modifications of the glass plate, the touch pad, and the touch panel have been described above; however, the present invention is not limited to the above embodiments and the like, and various modifications, alterations, improvement may be made within the scope of a gist of the present invention described in the claims.

REFERENCE SIGNS LIST 10 glass plate
11 first main surface
11a microscopic asperity surface
12 second main surface
20 laminate
21 antifouling layer
22 intermediate layer
30 touch pad
31 position detector
40 touch panel
41 position detector
42 image display device

What is claimed is:

1. A glass plate comprising:
a main surface; and
a microscopic asperity surface disposed on the main surface, the microscopic asperity surface forming peaks and valleys, wherein
when a reference plane is defined as a plane at a center, in a direction of height, of an interval of highest frequency in a histogram of height of shape data of a square region having 2 μm per side in the microscopic asperity surface,
a number of peaks that are higher than the reference plane by 20% or more of a maximum height difference in the square region is in a range between 1 or more and 300 or less.

2. The glass plate according to claim 1, wherein
surface roughness Ra of the microscopic asperity surface is in a range of 0.3 to 100 nm.

3. The glass plate according to claim 1, wherein
haze measured from the microscopic asperity surface side of the glass plate is in a range between 0% or more and 2% or less.

4. A laminate comprising:
the glass plate according to claim 1; and
an antifouling layer at least a part of which is formed on the microscopic asperity surface.

5. The laminate according to claim 4, further comprising:
an intermediate layer between the glass plate and the antifouling layer.

6. The laminate according to claim 5, wherein
the intermediate layer includes at least one of an oxide layer, a nitride layer, an oxynitride layer, and a metal layer.

7. The laminate according to claim 4, wherein
visible light reflectance of the laminate measured from the antifouling layer side is in a range of 0 to 3%.

8. A touch pad comprising:
the laminate according to claim 4; and
a position detector configured to detect a touch position of a finger on the laminate.

9. A touch panel comprising:
the laminate according to claim 4;
a position detector configured to detect a touch position of a finger on the laminate; and
an image display device configured to display an image according to a detection result obtained by the position detector.

10. A glass plate comprising:
a main surface; and
a microscopic asperity surface disposed on the main surface, the microscopic asperity surface forming peaks and valleys, wherein
summit density, obtained after removing a wavelength component of 0.05 μm or less from shape data of a square region having 2 μm per side in the microscopic asperity surface using an S-filter described in the International Standard ISO 16610-61, is in a range between 1/$\mu m^2$ or more and 170/$\mu m^2$ or less.

11. The glass plate according to claim 10, wherein
surface roughness Ra of the microscopic asperity surface is in a range of 0.3 to 100 nm.

12. The glass plate according to claim 10, wherein
haze measured from the microscopic asperity surface side of the glass plate is in a range between 0% or more and 2% or less.

13. A laminate comprising:
the glass plate according to claim 10; and
an antifouling layer at least a part of which is formed on the microscopic asperity surface.

14. The laminate according to claim 13, further comprising:
an intermediate layer between the glass plate and the antifouling layer.

15. The laminate according to claim 14, wherein
the intermediate layer includes at least one of an oxide layer, a nitride layer, an oxynitride layer, and a metal layer.

16. The laminate according to claim 13, wherein
visible light reflectance of the laminate measured from the antifouling layer side is in a range of 0 to 3%.

17. A touch pad comprising:
the laminate according to claim 13; and
a position detector configured to detect a touch position of a finger on the laminate.

18. A touch panel comprising:
the laminate according to claim 13;
a position detector configured to detect a touch position of a finger on the laminate; and
an image display device configured to display an image according to a detection result obtained by the position detector.

* * * * *